United States Patent [19]

Früngel

[11] 4,109,127
[45] Aug. 22, 1978

[54] APPARATUS AND METHOD FOR CASE HARDENING STEEL TOOLS BY APPLICATION OF HEATING PULSES

[76] Inventor: Frank Früngel, Herwigredder 105a, 2000 Hamburg 56, BRD, Fed. Rep. of Germany

[21] Appl. No.: 661,165

[22] Filed: Feb. 25, 1976

Related U.S. Application Data

[62] Division of Ser. No. 489,946, Jul. 18, 1974.

[30] Foreign Application Priority Data

Jul. 25, 1973 [DE] Fed. Rep. of Germany ....... 2337684

[51] Int. Cl.² .............................................. H05B 5/04
[52] U.S. Cl. ................................... 219/7.5; 148/147; 219/10.77; 219/10.43; 219/10.57
[58] Field of Search ............... 219/10.41, 10.43, 10.75, 219/10.77, 7.5, 10.57; 148/1, 4, 14, 144, 145, 148, 152, 154, 147

[56] References Cited

U.S. PATENT DOCUMENTS

| | | | |
|---|---|---|---|
| 2,371,459 | 3/1945 | Mittelman | 219/10.41 X |
| 2,400,472 | 5/1946 | Strickland | 219/10.41 |
| 2,935,433 | 5/1960 | Pribyl | 148/152 X |
| 3,178,324 | 4/1965 | Grange et al. | 148/144 X |
| 3,240,639 | 3/1966 | Lihl | 148/154 X |
| 3,332,036 | 7/1967 | Kappenhagen et al. | 219/10.75 X |
| 3,748,425 | 7/1973 | Potter | 219/10.75 X |
| 3,763,343 | 10/1973 | Rocklin | 219/76 |
| 3,806,690 | 4/1974 | Frungel | 219/10.77 |

OTHER PUBLICATIONS

Tudbury, "Basics of Induction Heating", 1960, vol. I, pp. I-66, I-68, vol. II, pp. II-74.

*Primary Examiner*—Bruce A. Reynolds
*Attorney, Agent, or Firm*—Michael J. Striker

[57] ABSTRACT

A high frequency oscillator is pulsed on and off to create at least a first and second pulse to be applied by inductive heating to a steel tool which has not previously been heat treated. The pulse width, amplitude and interval between pulses are adjusted for a given alloy and then kept constant during the production run. A Hartley oscillator with a frequency above 10 MHz is utilized and the pulses have pulse widths of less than 100 milliseconds.

6 Claims, 6 Drawing Figures

APPARATUS AND METHOD FOR CASE HARDENING STEEL TOOLS BY APPLICATION OF HEATING PULSES

This is a division of application Ser. No. 489,946, filed July 18, 1974.

BACKGROUND OF THE INVENTION

This invention relates to case hardening of steel, and particularly to apparatus and methods in which steel is case hardened by the application of a pulse which is generally less than 100 milliseconds.

In conventional equipment of this type, an inductive pulse of high frequency or a laser pulse is used. Use of such a pulse results in very fine grained steel with a hardness at least corresponding to the hardness which the base material would reach with a sudden quenching from temperatures above the $A_{C3}$ point. For martensitic steels, such conventional quenching methods result in a high degree of brittleness so that the tools must be subjected to further thermal treatment such as annealing in order to achieve an optimum compromise between brittleness and hardness. The hardness in this conventional quenching method is thus always less than the hardness which the tool would have immediately after the quenching operation. However, the pulse treatment which is previously known results in a fine grained structure which does not require subsequent heat treatment because the brittleness has been considerably reduced.

However, conventional heat treatment by pulse application results in uniform hardness only if the material has been previously hardened and heat treated or annealed. Virgin steels which are subjected to such single pulses often yield in a wide distribution of hardness values. This lack of uniformity is shown in varying hardness values among units and in variations within a single profile as for example when the pulses are applied to the sawteeth of a tool. Of course, in production the base material cannot always be a prehardened steel.

SUMMARY OF THE INVENTION

It is an object of the present invention to furnish a method and apparatus for pulse hardening of steel which has not been previously treated.

In accordance with the method of the present invention, a steel tool is case hardened by applying thereto a first pulse having a preadjusted pulse width and amplitude and further, applying a second pulse also having a preadjusted pulse width and pulse amplitude after a preadjusted time interval following said first pulse. The adjustment takes place prior to the production run and is then kept constant. At least two pulses are used. It has been found that results obtained by this method are comparable to those attained by the use of a single pulse applied to previously hardened and annealed base material.

An attempt has been made to find a logical reason for these observed results. It is postulated that the first pulse serves to orient free carbon in the steel or steel alloy correctly within the grating, that is the carbon atoms are arranged in a cubic centered grating causing a type of homogenization by the first pulse while the subsequent pulse achieves the actual hardening with the very fine grained end result. Thus when more than two pulses are used, the first pulse may be utilized for thermal pretreatment. Surprisingly the use of a plurality of pulses of this type has never resulted in brittleness and in the undesired thermal stresses and resultant cracks during the treatment.

This may be explained by the fact that the application of the very brief pulses to the material cause the material to be heated above the $A_{C3}$ point and that the resultant high temperatures serve to equalize the internal stresses within the relatively small affected volume.

The novel features which are considered as characteristic for the invention are set forth in particular in the appended claims. The invention itself, however, both as to its construction and its method of operation, together with additional objects and advantanges thereof, will be best understood from the following description of specific embodiments when read in connection with the accompanying drawings.

DESCRIPTION OF THE PREFERRED EMBODIMENTS

A preferred embodiment of the present invention will now be described with reference to the drawings.

Figure 1A:
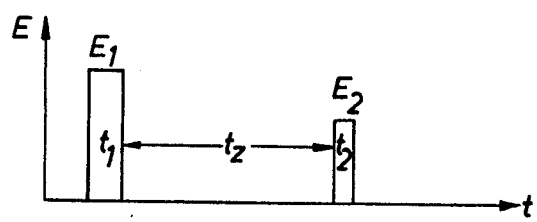
FIGS. 1A and 1B show timing diagrams of the first and second applied pulses and the resultant temperature in the tool.
Figure 1B:
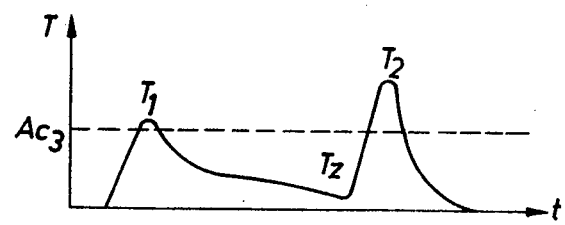

First, the timing diagrams of FIGS. 1A and 1B will be used to explain the basic idea of the present invention. in FIGS. 1A and 1B the timing diagrams A and B both have time axes as abscissa, the two axes being in synchronism. in FIG. 1A the ordinate is the pulse energy E, while in FIG. 1B the corresponding temperature T of the surface element to be hardened is shown. Two pulses having, respectively, a pulse width $t_1$ and $t_2$ are shown. The pulse width may be the same or may be different. The amplitudes $E_1$ and $E_2$ may also be either the same or different. As shown in FIG. 1B, during the time $t_1$ the temperature in the element to be hardened rises to a value $T_1$ which lies above the $A_{C3}$ temperature. Following the application of the pulse the temperature decreases by self-quenching to a temperature $T_z$ which serves as the initial temperature for the application of the new pulse. The application of the second pulse then causes a temperature rise to the maximum value of $T_2$. This value is quenched rapidly in order to achieve the final hardness. Of course, the less the time between pulses, $t_z$, the higher will be the temperature $T_z$. If $t_z$ were zero, that is if the two pulses occurred one immediately after the other, the temperature rise would of course be much higher and would correspond to the summation of the two energies $E_1$ and $E_2$. Similarly, if $t_z$ were very long, $T_z$ would again reach the temperature represented by the zero point of the ordinate, that is the initial temperature would be the same for the second pulse as it was for the first pulse. Thus the temperature $T_2$ depends on the energy content of the pulses, the time between pulses and quenching properties of the steel. Whem more than two pulses are used a similar situation prevails.

In FIG. 1B, the $A_{C3}$ temperature is shown by a dashed line. This is the minimum temperature that must be reached in order to achieve a transformation. Generally temperature $T_1$ is chosen to lie immediately above the $A_{C3}$ point and the energy $E_1$ is chosen accordingly. Temperature $T_2$ can under certain circumstances greatly exceed the $A_{C3}$ temperature.

Figure 2A:
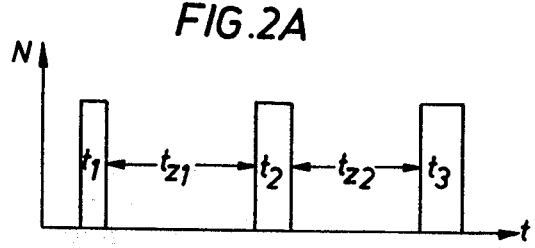
FIGS. 2A and 2B show timing diagrams for the first, second and third pulse and the corresponding temperatures.
Figure 2B:
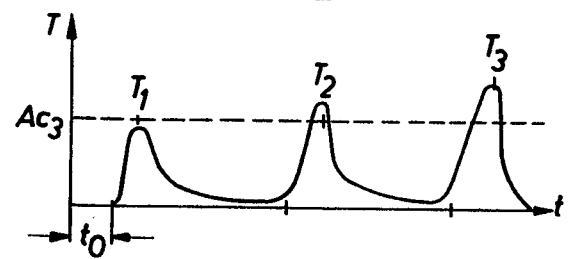

Pulse and time diagrams for steels with a low carbon content and, for example, tungsten content, are shown in FIGS. 2A and 2B. In this type of steel it is important that the first temperature jump serves to position the other alloying material in the grating. This may be optimally achieved either below or above the $A_{C3}$ temperature. During the second pulse the heating is then carried on to a much higher temperature $T_2$ in order to cause the correct arrangement of the carbon atoms. Finally, the third pulse is used to achieve an even higher temperature $T_3$ in order to effect the final hardening. The corresponding pulses are shown in FIG. 2A. In this case the ordinate is the power P and the adjustment for the correct energy takes place simply by the choice of the pulse width $t_1$, $t_2$ and $t_3$. The intervals between pulses, $t_{z1}$ and $t_{z2}$, are also adjustable for each material. $T_3$ may be so chosen that the last heating pulse requires a pulse width which is less than either $t_1$ or $t_2$. In this case the procedure approaches a conventional heat treatment. Thus the great multiplicity of commercially available steels requires a great variety of pulse energies and pulse intervals.

In practice, for unalloyed carbon steels the pulse widths $t_1 \ldots t_n$ are less than 10 milliseconds while the intervals between pulses ($t_{z1} \ldots t_{zn}$) are approximately 50 milliseconds.

For more or less highly alloyed steels, and especially for steels having a high chrome or tungsten content, longer pulse widths are generally required. These may lie in the range of 20 to 50 milliseconds with pulse intervals of 50 to 150 milliseconds. This is explained by the relatively low heat conductivity of such steels and, in the case of tungsten steels, by the relatively low dissolving speed of tungsten carbide in the base material.

In practice, a number of tests must generally be carried out in order to find the optimum number of pulses, their pulse width, power and the distance between pulses for any given steel. Thereafter the method and apparatus operates completely automatically.

Figure 3:
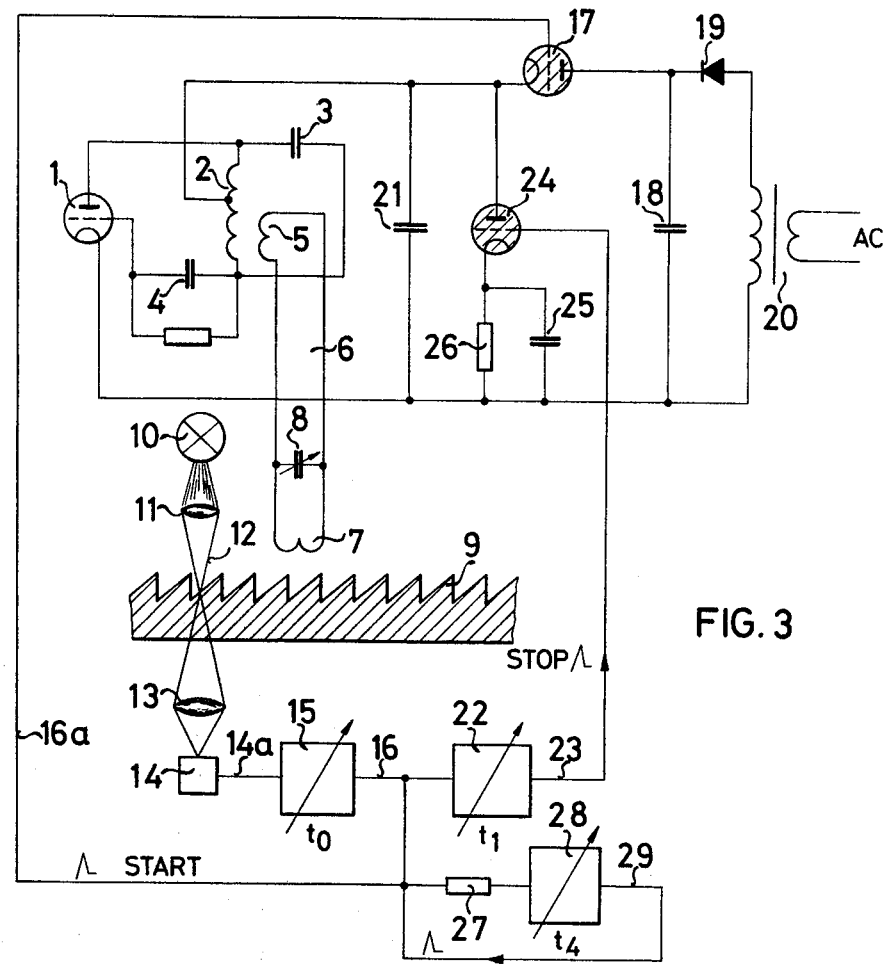
FIG. 3 shows a preferred embodiment of the present invention.

A preferred embodiment of apparatus for carrying out the method of the present invention automatically after initial adjustment is shown in FIG. 3. Reference numeral 1 refers to the oscillator tube which has an oscillating coil 2 and an oscillating capacitor 3 as well as a capacitor-resistor parallel circuit all connected to form a Hartley oscillator. The oscillator furnishes a high-frequency power pulse having a frequency exceeding 10 MHz. A coupling coil 5 and line 6 furnish energy to a heating coil 7 which conductor is tuned to resonance by a capacitor 8. also shown are sawteeth 9 which are heated by the pulse derived from coil 7. A light barrier arrangement comprises a lamp 10 and a condenser lens 11. As each sawtooth 9 cuts the resultant light beam, a light-to-dark transition is sensed by photodiode 14 which receives the light beam through a further lens 13. The resultant signal on line 14a is delayed by an adjustable time delay 15 which furnishes a variable time delay $t_0$. Time delay 15 may be simply a resistor-capacitor circuit having an adjustable resistor. The output of time delay 15 is furnished on a line 16 and is applied through a line 16a to the grid of a thyratron 17. The anode of thyratron 17 is connected to a capacitor 18. Connected in parallel with capacitor 18 is the series combination of a diode 19 and the secondary winding of a transformer 20. Primary winding of transformer 20 is connected to the AC power source. The cathode of thyratron 17 is connected to a capacitor 21 which is a small high-frequency capacitor. Connected in parallel with capacitor 21 is a quenching thyratron 24. Connected to the cathode of thyratron 24 is a parallel circuit comprising a capacitor 25 and a resistor 26. The grid of thyratron 24 is connected through a line 23 to the output of a second delay unit 22 whose input is connected to the above-mentioned line 16. Line 16 is also connected to the input of a delay unit 28 through a resistor 27. The output of delay unit 28 is connected through a line 29 to line 16a.

The above-described arrangement operates as follows:

As a tooth 9 passes the light barrier arrangement, a signal is produced by photodiode 14. This signal after delay in unit 15 serves to ignite thyratron 17. As soon as thyratron 17 is ignited, fully charged capacitor 18 discharges, causing capacitor 21 to charge. Tube 1 begins to oscillate and the oscillations are applied to coil 7.

Further, the signal on line 16 also serves as an input to delay 22 which, in a preferred embodiment of the present invention is identical to delay unit 15. Unit 22 is adjusted to have a time delay equal to the desired pulse width $t_1$. At the end of time delay $t_1$ a signal appears on line 23 which causes thyratron 24 to fire. Capacitor 25 in the cathode circuit of thyratron 24 is charged immediately, thereby causing thyratron 17 to switch to the non-conductive state. The oscillations stop and the pulse at coil 7 is thus terminated.

Further, line 16 was connected to the input of an adjustable delay 28. Unit 28 is adjusted to furnish a delay $t_4$ where $t_4 = t_1 + t_{z1}$. The resultant output after this time delay on line 29 again causes thyratron 17 to fire. Further, it is again applied to unit 22 which causes a pulse to appear on line 23 after time delay $t_1$. This latter pulse is applied to the grid of thyratron 24 to terminate the second pulse.

It will be noted that in the above embodiment the pulse width of the two pulses is equal, both pulse widths being equal to $t_1$. The pulse width can be adjusted of course by adjusting the time delay of unit 22 while the distance between pulses is adjusted by adjusting the time delay of unit 28. The delay of unit 15 will be a fixed time interval $t_0$ which is the time required for the element on a sawtooth to reach the operative vicinity of coil 7 following the time that the light beam has been cut.

It is of course also possible to use a cam and microswitch arrangement to replace the light barrier arrangement shown in FIG. 3.

Figure 3A:
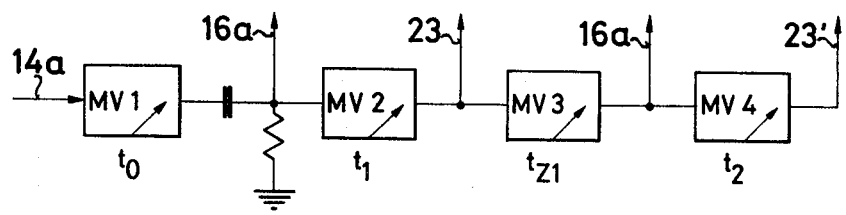
FIG. 3a shows a shift register as an alternate embodiment for creating the delays required in FIG. 3.

To achieve different pulse widths for each pulse, a shift register as shown in FIG. 3a may be utilized. The shift register shown in FIG. 3a comprises four multivibrators each having an adjustable time constant. In a preferred embodiment these are monostable multivibrators, each of which switches to the unstable state by a signal at its input. The length of time that each multivibrator is in the unstable state may be varied independently as indicated by the arrows in FIG. 3a. The first multivibrator MV1 is adjusted to have a time constant $t_0$. Its output, after differentiation if required, constitutes the signal on line 16a of FIG. 3, that is the signal applied to the grid of thyratron 17. The same signal is also applied to the input of multivibrator MV2 whose time constant is adjusted to be equal to the desired pulse width, $t_1$, of the first pulse. The output of MV2, again after differentiation if required, furnishes a signal on line 23, that is a signal to the grid of thyratron 24 thereby terminating the pulse. The signal at the output of multivibrator MV2 is also applied to the input of multivibrator MV3 whose time constant is equal to the desired time between pulses $t_{z1}$. The output of multivibrator MV3 is also applied to the grid of thyratron 17. It further serves as an input to multivibrator MV4 whose time constant is adjusted for the desired pulse width, $t_2$, of the second pulse. The output of multivibrator MV4 is applied to the quenching thyratron 24 thereby terminating the second pulse. It is of course obvious that the chain could be continued for as many pulses as desired, an amplifier being connected between stages where required.

The method and apparatus according to the present invention leads to hardness values of above 900 $H_v$(Vickers hardness) when applied to broaches of highly alloyed steel. The application of two and three pulses has been found successful. The present invention was also successfully employed to obtain a very uniform hardening for needles in high-speed printing mechanisms. Two pulses were used and, according to the type of steel used, hardnesses of between 950 and 1150 $H_v$ were reached. Uniform results were obtained throughout even though the material was not pretreated. The invention was also succesfully applied to the teeth of slitting cutters and saw blades made of tool steel.

To avoid overheating or melting of steel surface elements it is proposed to provide photoelectric circuit means observing the temperature of said steel surface to switch off the repetitive pulses after having reached a predetermined temperature above the $A_{c3}$— point but below the melting point.

Furthermore it is favourable for the idea of the invention to provide a current amplitude of said pulse power in the inductor coil of such a value that the ferromagnetic behaviour of the treated steel is oversaturated already at the beginning of the pulse. This leads to a constant penetration depth of the inductive heating field in the steel surface avoiding a jumping of said depth at the Curie point because the steel has already due to the oversaturation the non-ferromagnetic behaviour. Preferable this is the case at a current amplitude of more than 30 Amp turns per cm.

The present invention is thus shown to be useful in obtaining uniform repeatable results in case hardening of steel which was previously untreated.

While the invention has been illustrated and described as embodied in a particular form of a generator for furnishing the pulses applied to the steel tool and specific embodiments of the time delay units, it is not intended to be limited to the details shown, since various modifications and circuit changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. Apparatus for case hardening a predetermined portion of the surface of a steel tool, comprising, in combination, first means including inductive coupling means for applying at least a first and second pulse to said predetermined portion of said surface, thereby heating said portion; second means connected to said first means for adjusting the pulse width of said pulses to pulse widths below 100 milliseconds; and third means connected to said first means for adjusting the time interval between said first and second pulse.

2. Apparatus as set forth in claim 1, wherein said first means comprises an oscillator for furnishing a high frequency power pulse, said coupling means coupling said high frequency pulse to said predetermined portion of said surface, and pulsing means connected to said oscillator for initiating said high frequency power pulse in response to a start signal and stopping said high frequency power pulse in response to stop signals; further comprising means for furnishing a first start signal; wherein said third means comprise means for furnishing a second start signal following an adjustable first time delay upon receipt of said first start signal; and wherein said second means comprise means for furnishing said stop signals after a second adjustable time delay following receipt of respective ones of said start signals.

3. Apparatus as set forth in claim 2, wherein said oscillator is a Hartley oscillator furnishing a high frequency power pulse having a frequency exceeding 10 MHz.

4. Apparatus as set forth in claim 2, further comprising transport means for transporting said tool along a predetermined path past said coupling means and wherein said means for furnishing a start signal comprise means positioned along said path for furnishing said start signal when said tool is in a predetermined position relative to said coupling means.

5. In a case hardening apparatus, in combination, oscillator means; means operative for deriving from the signal produced by the oscillator means a sequence of inductive hardening pulses and applying them to the steel surface to be case hardened; and means operative for switching off the oscillator means upon the reaching of a predetermined temperature above the $A_{c3}$-point but below the melting point of the steel.

6. In a case hardening apparatus, in combination, means for applying inductive heating pulses to the surface of the steel to be case hardened, including an inductor heating loop generator; and means establishing in the inductor heating loop generator a high-frequency current establishing a magnetization of the steel to be treated above the ferromagnetic saturation of the steel, preferably in excess of 30 amperes/centimeter.

* * * * *